US009997932B2

(12) United States Patent
Li et al.

(10) Patent No.: US 9,997,932 B2
(45) Date of Patent: Jun. 12, 2018

(54) CHARGE CABINET AND STORAGE DEVICE THEREOF

(71) Applicant: AVer Information Inc., New Taipei (TW)

(72) Inventors: Yi-Chen Li, New Taipei (TW); Chih-Hung Cheng, New Taipei (TW); Jui-Hsuan Chiang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 141 days.

(21) Appl. No.: 15/097,755

(22) Filed: Apr. 13, 2016

(65) Prior Publication Data
US 2017/0187205 A1   Jun. 29, 2017

(30) Foreign Application Priority Data
Dec. 23, 2015 (TW) .............................. 104143267 A

(51) Int. Cl.
*H02J 7/00* (2006.01)
*A47B 81/00* (2006.01)
*A47B 97/00* (2006.01)

(52) U.S. Cl.
CPC ............ *H02J 7/0027* (2013.01); *A47B 81/00* (2013.01); *A47B 97/00* (2013.01); *H02J 7/0044* (2013.01); *A47B 2097/003* (2013.01)

(58) Field of Classification Search
USPC ........................................................ 320/107
See application file for complete search history.

(56) References Cited

U.S. PATENT DOCUMENTS

| | | | |
|---|---|---|---|
| 8,752,848 B2* | 6/2014 | Petrick | H01R 13/465 280/47.35 |
| 9,130,385 B2* | 9/2015 | Chen | H02J 7/0027 |
| 2005/0110461 A1* | 5/2005 | McConnell | G09B 7/00 320/116 |
| 2009/0096336 A1* | 4/2009 | Petrick | G06F 13/4022 312/237 |
| 2011/0193524 A1* | 8/2011 | Hazzard | G06F 1/1632 320/114 |
| 2016/0372952 A1* | 12/2016 | Chen | H02J 7/0054 |
| 2017/0155260 A1* | 6/2017 | Chen | A47B 81/00 |
| 2017/0187205 A1* | 6/2017 | Li | H02J 7/0027 |
| 2017/0256965 A1* | 9/2017 | Clark | H02J 7/0027 |

* cited by examiner

*Primary Examiner* — Samuel Berhanu
(74) *Attorney, Agent, or Firm* — Muncy, Geissler, Olds & Lowe, P.C.

(57) ABSTRACT

A storage device includes a base and a plurality of wire management modules. The wire management module includes a partition and a positioning assembly. The partition is disposed to the base and has a supporting surface and a wire management groove. The wire management groove is located at the supporting surface for accommodating a wire. The positioning assembly includes a first positioning member, a second positioning member and an assembling member. The first positioning member is disposed to the partition. The second positioning member is connected to the assembling member. The assembling member is assembled together with the partition. The second positioning member is rotatable around the edge of the second positioning member as a rotation axis in relation to the assembling member to be at either a fastening position or a releasing position. The partitions and the base jointly form a plurality of accommodation spaces.

18 Claims, 12 Drawing Sheets

US 9,997,932 B2

CHARGE CABINET AND STORAGE DEVICE THEREOF

CROSS-REFERENCE TO RELATED APPLICATIONS

This non-provisional application claims priority under 35 U.S.C. § 119(a) on Patent Application No(s). 104143267 filed in Taiwan on Dec. 23, 2015, the entire contents of which are hereby incorporated by reference.

TECHNICAL FIELD

The present disclosure provides a storage device and a charge cabinet, more particular to a storage device having a wire management structure, and a charge cabinet including the storage device.

BACKGROUND

Since mobile electronic devices have many advantages such as being highly portable, simple to operate, highly entertaining, excellent extension capabilities and excellent display capabilities, many education institutions use mobile electronic devices as multimedia devices for educating students. Generally, educational institutions purchase the mobile electronic devices and the charging cabinets at the same time. The charging cabinet is used for storing and charging the mobile electronic devices.

SUMMARY

According to one aspect of the disclosure, a storage device includes a base and a plurality of wire management modules. Each of the wire management modules includes a partition and a positioning assembly. The partition is disposed to the base and has a supporting surface and a wire management groove at a side of the partition away from the base. The wire management groove is located at the supporting surface, and the wire management groove is for accommodating a wire. The positioning assembly includes a first positioning member, a second positioning member and an assembling member. The first positioning member is disposed to the partition and protrudes out of the supporting surface. An edge of the second positioning member is connected to the assembling member. The assembling member is assembled together with the partition. The second positioning member is rotatable around the edge of the second positioning member as a rotation axis in relation to the assembling member to be at either a fastening position or a releasing position. When the second positioning member is at the fastening position, the first positioning member and the second positioning member face each other and jointly cover a part of the supporting surface for positioning a part of the wire between the first positioning member and the second positioning member. When the second positioning member is at the releasing position, the second positioning member and the first positioning member are separated from each other for releasing the wire. The partitions of the plurality of wire management modules and the base jointly form a plurality of accommodation spaces.

According to another aspect of the disclosure, a storage device includes a base and a plurality of wire management modules. Each of the wire management modules includes a partition and a positioning assembly. The partition is disposed to the base and has a supporting surface and a wire management groove at a side of the partition away from the base. The wire management groove is located at the supporting surface, and the wire management groove is for accommodating a wire. The positioning assembly includes a first positioning member, a second positioning member and an assembling member. An edge of the first positioning member is connected to the partition. The second positioning member is connected to the assembling member and protrudes out of the supporting surface. The assembling member is assembled together with the partition. The first positioning member is rotatable around the partition with the edge of the first positioning member as a rotation axis in relation to the assembling member to be at either a fastening position or a releasing position. When the first positioning member is at the fastening position, the first positioning member and the second positioning member face each other and jointly cover a part of the supporting surface for positioning a part of wire between the first positioning member and the second positioning member. When the first positioning member is at the releasing position, the first positioning member and the second positioning member are separated from each other for releasing wire. The partitions of the plurality of wire management modules and the base jointly form a plurality of accommodation spaces.

According to still another aspect of the disclosure, a charge cabinet includes a case, a power supply, a plurality of wires and the aforementioned storage device. The power supply is disposed to the case. The wires are electrically connected to the power supply. The storage device is disposed in the case.

BRIEF DESCRIPTION OF THE DRAWINGS

The present invention will become more understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
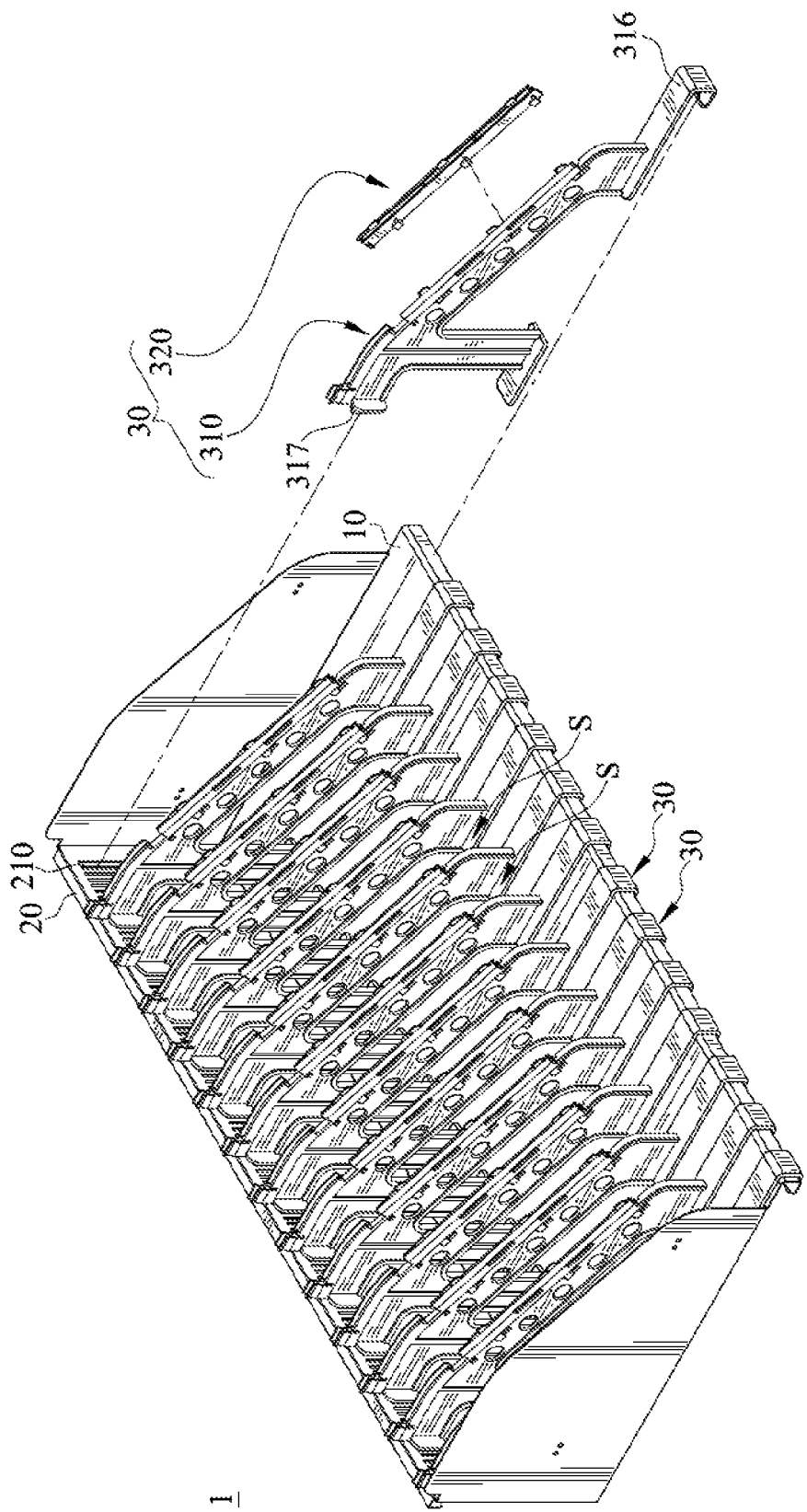
FIG. 1 is an exploded view of a storage device according to a first embodiment.
Figure 2:
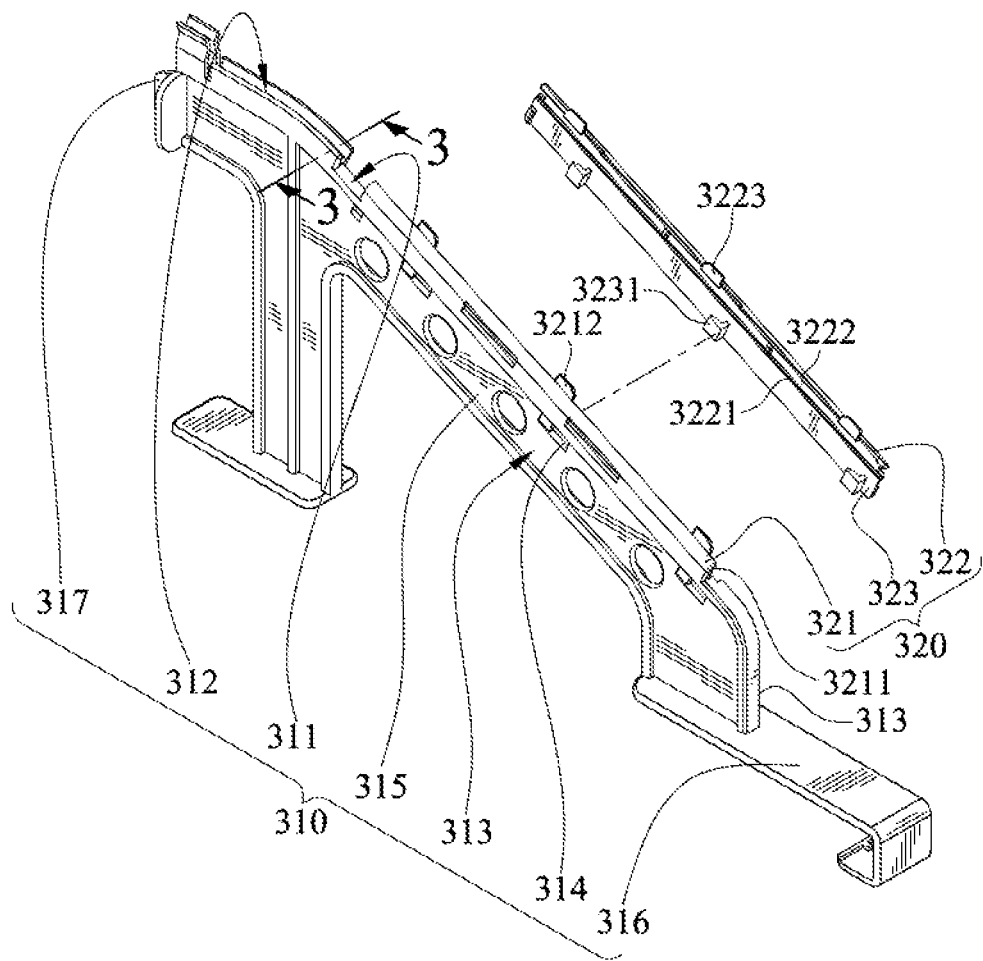
FIG. 2 is a perspective view of the wire management module in FIG. 1.
Figure 3:
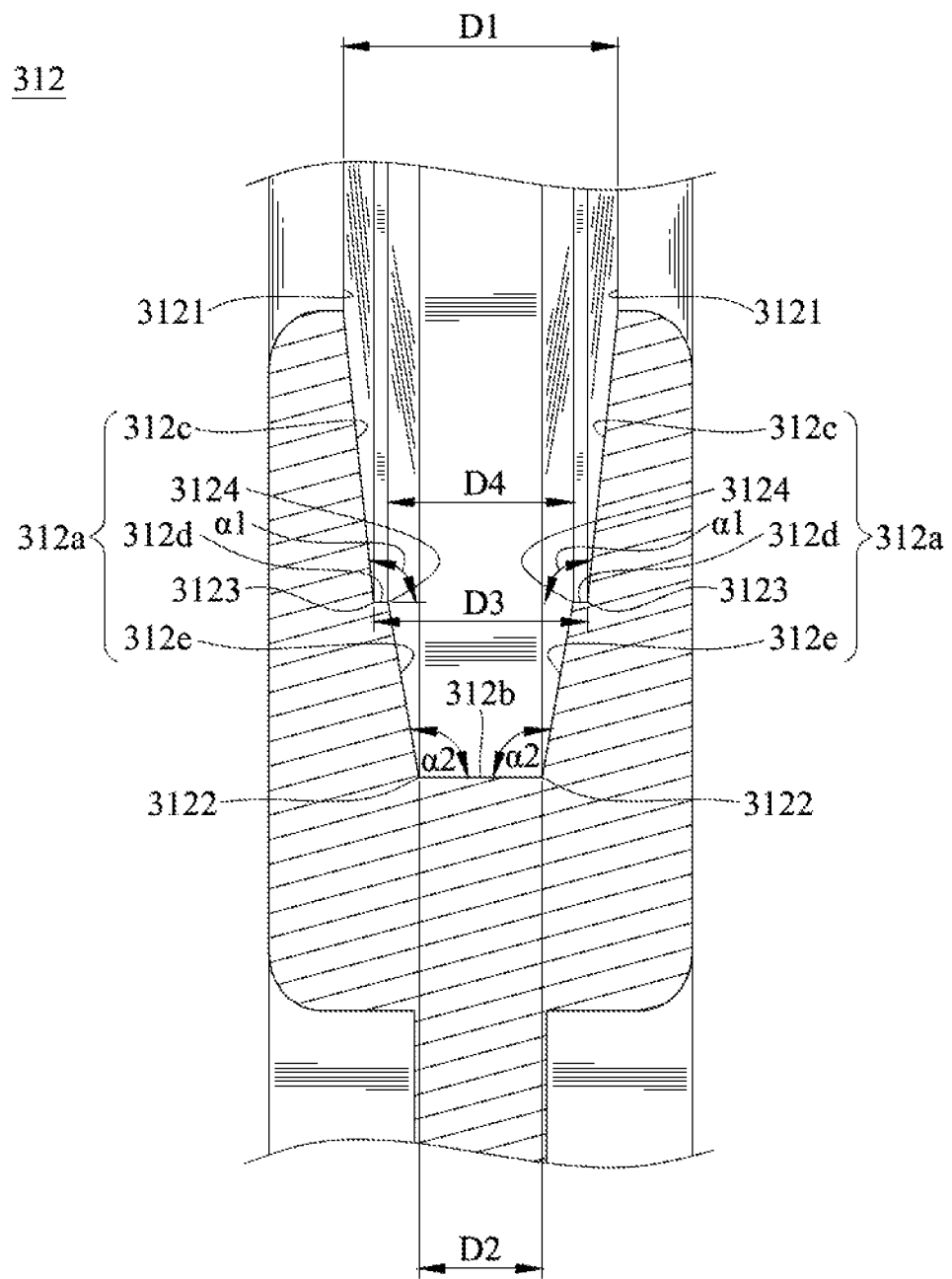
FIG. 3 is a partial cross-sectional view of the wire management module in FIG. 1 along a line 3-3.

Please refer to FIG. 1 to FIG. 3. FIG. 1 is an exploded view of a storage device according to a first embodiment. FIG. 2 is a perspective view of the wire management module in FIG. 1. FIG. 3 is a partial cross-sectional view of the wire management module in FIG. 1 along a line 3-3. In this embodiment, the storage device 1 may include a base 10, a board 20 and a plurality of wire management modules 30.

The base 10 and the board 20 may be made of metal or plastic. The board 20 may stand on the base 10 and include a plurality of holes 210. Each of the wire management modules 30 may include a partition 310 and a positioning assembly 320. The partition 310 may stand on the base 10, and the partitions 310 and the base 10 may jointly form a plurality of accommodation spaces S. Each of the accommodation spaces S may accommodate a mobile electronic device, such as tablet computer, laptop and smart phone.

Each of the partitions 310 may have a supporting surface 311, a wire management groove 312 for accommodating a wire, and opposite two side surfaces 313. The supporting surface 311 may be located at a side of the partition 310 away from the base 10, and the wire management groove 312 may be located at the supporting surface 311. The side surface 313 may be connected to the supporting surface 311 and face the accommodation space S. In this embodiment, both the supporting surface 311 and the wire management groove 312 are, for example, but not limited to, located at the top of the partition 310, so the accommodation space S may have a larger capacity. In other embodiments, both the supporting surface and the wire management groove may be located at the side surface facing the accommodation space S. Furthermore, the wire management groove 312 is formed on a part of the supporting surface 311 in this embodiment, but the disclosure is not limited thereto. In other embodiments, the wire management groove can be formed on all parts of the supporting surface. The partition 310 may further have a plurality of recesses 314 located at the side surface 313, and each of the recesses 314 may have opposite two ends which are respectively located at the two side surfaces 313.

The wire management groove 312 may have two limiting surfaces 312a and a bottom surface 312b. Each of the two limiting surfaces 312a has a first edge 3121 and a second edge 3122 that are opposite to each other. The two second edges 3122 are respectively connected to opposite two sides of the bottom surface 312b. The distance D2 between the two second edges 3122 may be less than the distance D1 between the two first edges 3121. One or more of the two limiting surfaces 312a may have a first limiting section 312c, a supporting section 312d and a second limiting section 312e. The first limiting section 312c, the supporting section 312d and the second limiting section 312e may be connected to each other. In this embodiment, both the two limiting surfaces 312a have the first limiting section 312c, the supporting section 312d and the second limiting section 312e connected to each other. The supporting section 312d is located between the first limiting section 312c and the second limiting section 312e. The first edge 3121 is the edge of the first limiting section 312c away from the supporting section 312d, and the second edge 3122 is the edge of the second limiting section 312e away from the supporting section 312d. The supporting section 312d has a side 3123 close to the first limiting section 312c, and a side 3124 close to the second limiting section 312e. The distance D3 between the two sides 3123 may be greater than the distance D4 between the two sides 3124. Therefore, a space formed by the two first limiting sections 312c and the two supporting sections 312d is favorable for accommodating a wire having a larger diameter, and a space formed by the two second limiting sections 312e and the bottom surface 312b is favorable for accommodating a wire having a smaller diameter, and thereby the wire management groove 312 is applicable to accommodate a variety of wires having different diameters. For example, the wire management groove 312 can be used for accommodating two wires having different diameters simultaneously or one of the two wires. In this embodiment, each of the two limiting surfaces 312a has the sections 312c, 312d and 312e, but the disclosure is not limited thereto. In other embodiments, one of the limiting surfaces has the sections while the other limiting surface is flat.

Furthermore, as shown in FIG. 3, the first limiting section 312c and the supporting section 312d of the limiting surface 312a may have an obtuse angle $\alpha 1$ therebetween, and the second limiting section 312e and the bottom surface 312b may have an obtuse angle $\alpha 2$ therebetween. Therefore, the first limiting section 312c and the second limiting section 312e tilt in relation to the bottom surface 312b whereby a wire may easily be put into the wire management groove 312 from such a larger opening at the top of the wire management groove 312 and may get into position between the two first limiting sections 312c or the two second limiting sections 312e.

The wire management modules 30 may be detachably disposed to the base 10 and the board 20. In detail, the partition 310 of the wire management module 30 may include a partitioning part 315, an assembling part 316 and a block 317 connected to each other. The supporting surface 311, the wire management groove 312, the side surface 131 and the recess 314 are all located at the partitioning part 315. The assembling part 316 may be detachably assembled together with an edge of the base 10 away from the board 20, and the block 317 may be detachably fastened into the hole 210 of the board 20. Therefore, different two ends of the wire management module 30 are respectively fixed to the base 10 and the board 20 by the assembling part 316 and the block 317.

The positioning assembly 320 may include a first positioning member 321, a second positioning member 322 and an assembling member 323. The first positioning member 321 is disposed to the partitioning part 315 of the partition 310, and the first positioning member 321 may protrude out of the supporting surface 311. In this embodiment, the first positioning member 321 is fixed to the supporting surface 311 of the partition 310; that is, the first positioning member 321 is mounted on the supporting surface 311, but the disclosure is not limited thereto. In other embodiment, the first positioning member can be fixed to the side surface of the partition, and the first positioning member extends from the side surface along a direction perpendicular to the normal line of the side surface so as to protrude out of the supporting surface. The second positioning member 322 may have an edge 3221 connected to the assembling member 323. In this embodiment, the second positioning member 322 and the assembling member 323 are integrally formed as a single plastic member, and the edge 3221 may be formed by a molding process for the plastic member, but the disclosure is not limited thereto. In other embodiments, the second positioning member and the assembling member may be two independent members, and the second positioning member is pivoted to the assembling member. The assembling member 323 is assembled together with the partitioning part 315; in detail, the assembling member 323 may includes a plurality of protrusions 3231 which may be respectively fastened into the recesses 314 at the side surface 313. Moreover, the first positioning member 321 may have a first concave surface 3211, and the second positioning member 322 may have a second concave surface 3222.

Figure 4A:
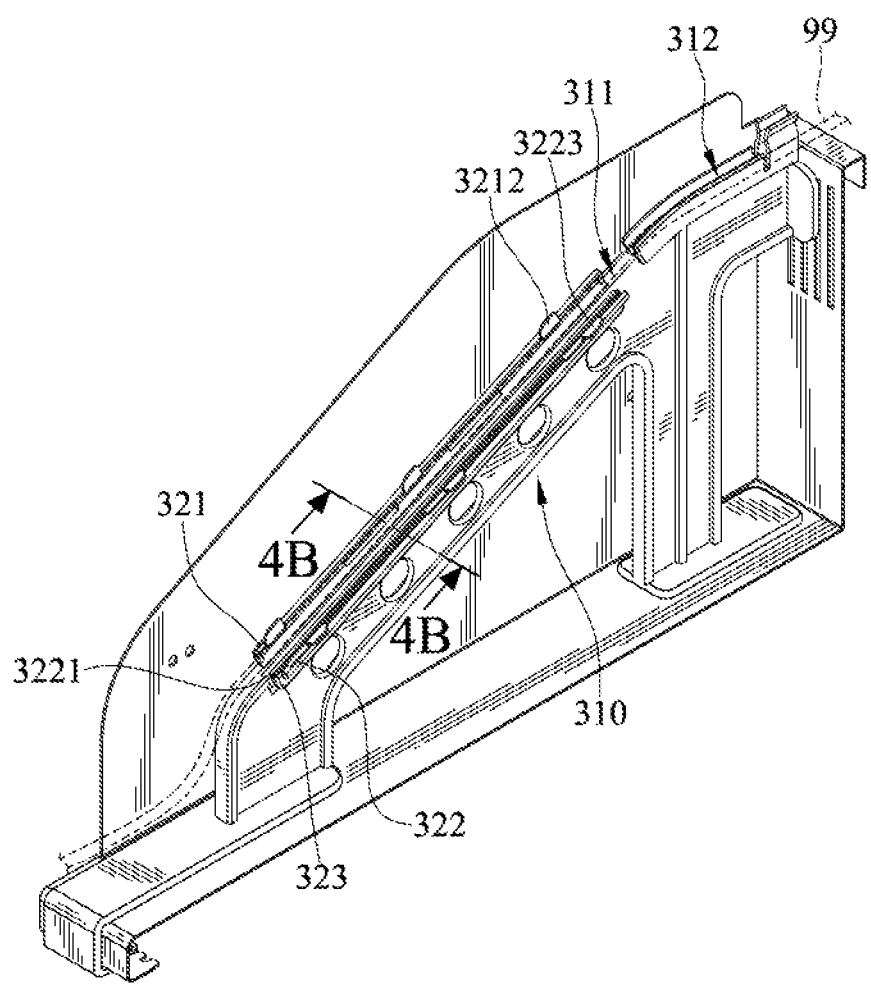
FIG. 4A is a perspective view of the wire management module in FIG. 1 with a positioning member located at a releasing position.
Figure 4B:
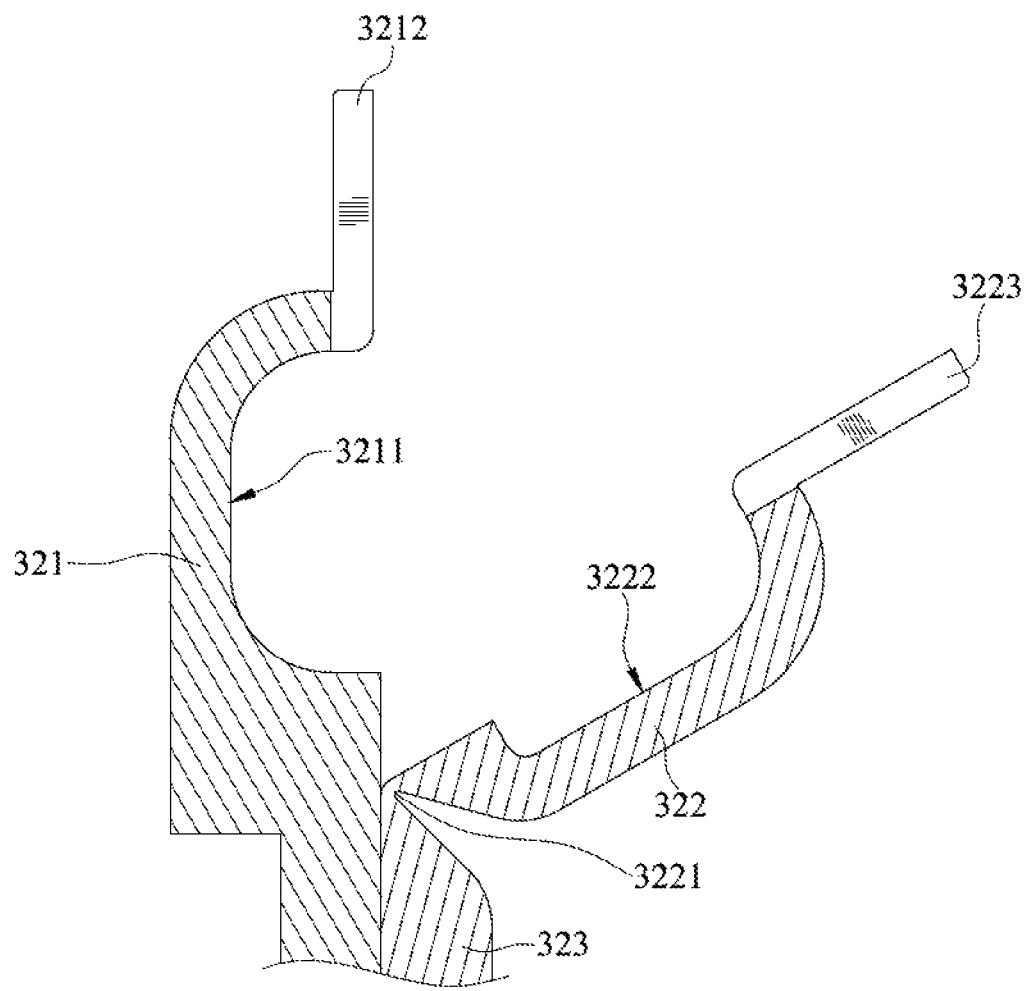
FIG. 4B is a partial cross-sectional view of the wire management module in FIG. 4A along a line 4B-4B.
Figure 5A:
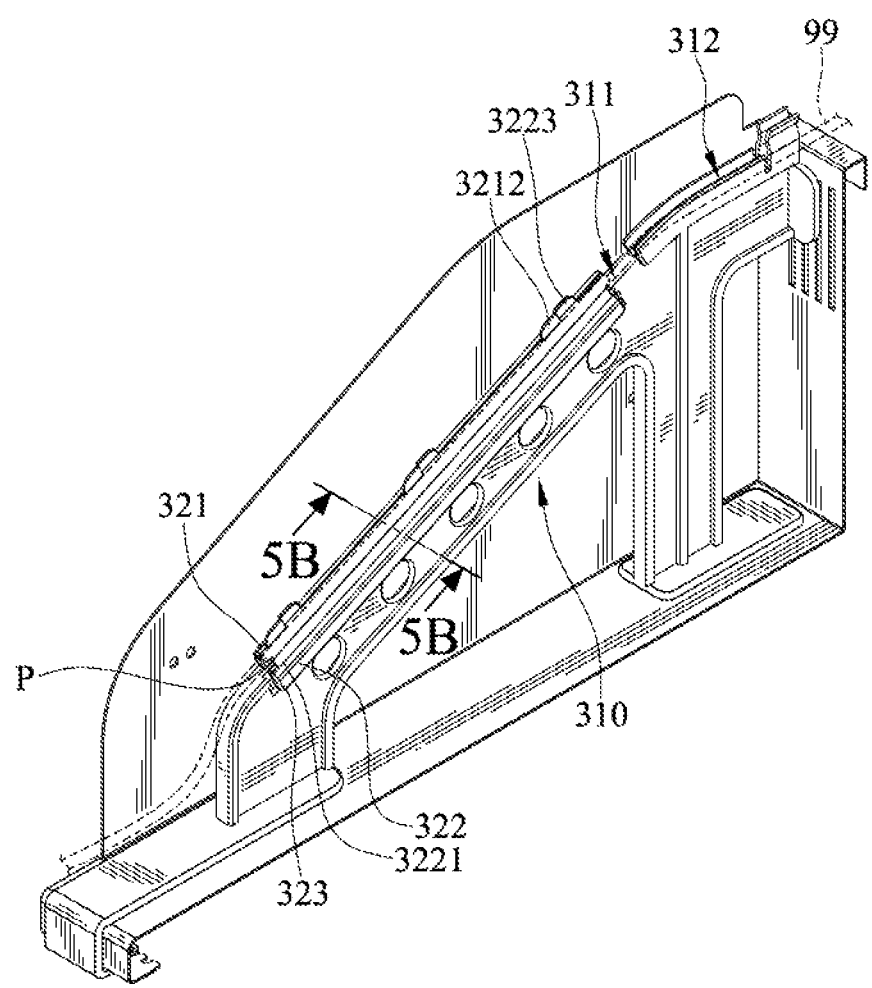
FIG. 5A is a perspective view of the wire management module in FIG. 4B with the positioning member located at a fastening position.
Figure 5B:
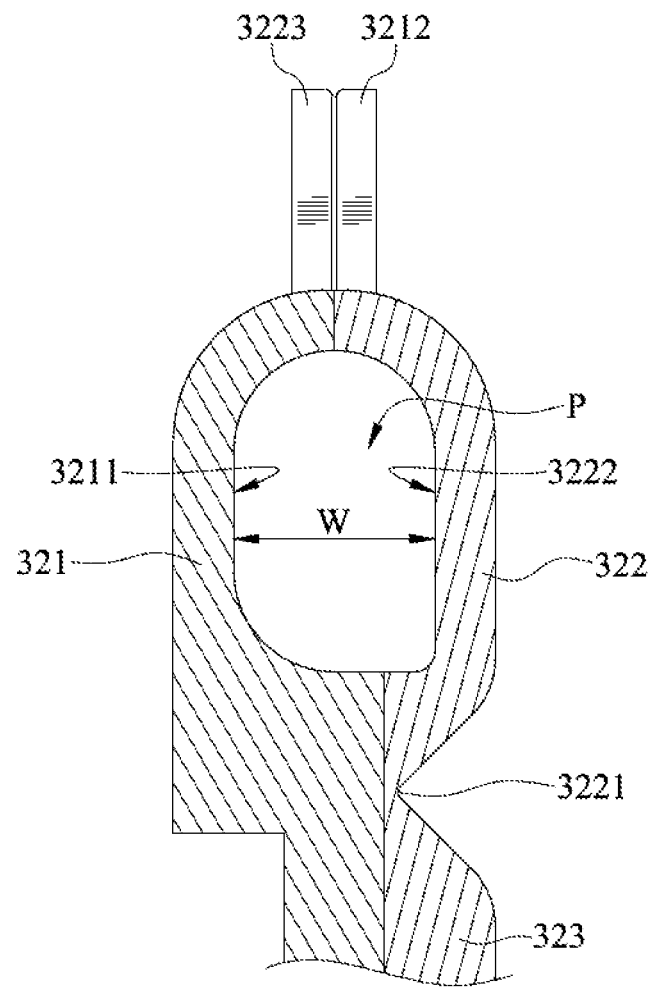
FIG. 5B is a partially cross sectional view of the wire management module in FIG. 5A along a line 5B-5B.

Please refer to FIG. 4A to FIG. 5B. FIG. 4A is a perspective view of the wire management module in FIG. 1 with a positioning member at a releasing state. FIG. 4B is a partially cross sectional view of the wire management module in FIG. 4A along a line 4B-4B. FIG. 5A is a perspective view of the wire management module in FIG. 4B with the positioning member at a fastening state. FIG. 5B is a partial cross-sectional view of the wire management module in FIG. 5A along a line 5B-5B. A method for positioning a wire 99 by the wire management module 30 is illustrated hereafter. In this embodiment, the second positioning member 322 is rotatable around the assembling member 323 with the edge 3221 as a rotation axis, and the second positioning member 322 has a fastening position and a releasing position. As shown in FIG. 4B, when the second positioning member 322 is at the releasing position, the second positioning member 322 is spaced apart from the first positioning member 321, and a user is capable of positioning the wire 99 in the wire management groove 312. In detail, the wire 99 can be disposed on the supporting surface 311, and the wire 99 can be pulled along the supporting surface 311 so as to be positioned into the wire management groove 312, or the wire 99 can be disposed from the top of the partition 310 into the wire management groove 312. The wire 99 may be adapted for charging the electronic device accommodated in the accommodation space S of the storage device 1.

The second positioning member 322 can rotate around the assembling member 323 so as to move from the releasing position to the fastening position. As shown in FIG. 5B, when the second positioning member 322 is at the fastening position, the first positioning member 321 and the second positioning member 322 face each other and together cover a part of the supporting surface 311 for positioning a part of the wire 99 between the first positioning member 321 and the second positioning member 322. In detail, the first concave surface 3211 of the first positioning member 321 faces the second concave surface 3222 of the second positioning member 322 when the second positioning member 322 is at the fastening position so as that the first positioning member 321 and the second positioning member 322 jointly position the wire 99 on the supporting surface 311. The concave surfaces 3211 and 3222 prevent the wire 99 from moving away from the supporting surface 311. The concave curve of the surfaces 3211 and 3222 is favorable for preventing the positioning members 321 and 322 from squeezing the wire 99; in detail, the first concave surface 3211, the second concave surface 3222 and a part of the supporting surface 311 covered by the positioning members 321, 322 together formed a groove P, and a width W (an axial diameter) of the grove P is greater than the diameter of the wire 99.

When it is necessary to release the wire 99, the second positioning member 322 is moved from the fastening position to the releasing position. Therefore, the second positioning member 322 moves away from the first positioning member 321 so that the wire 99 is movable relative to the partition 310, thereby the user is able to adjust a length of the wire 99 or replace the wire 99 with another wire having different diameter.

Furthermore, the first positioning member 321 may include at least one first fastening portion 3212, and the second positioning member 322 may include at least one second fastening portion 3223. The fastening portions 3212, 3223 may be two buckles which can be fastened together. The first fastening portion 3212 may be located at a side of the first positioning member 321 away from the supporting surface 311, and the second fastening portion 3223 may be located at a side of the second positioning member 322 away from the assembling member 323. The first fastening portion 3212 and the second fastening portion 3223 are fastened to each other when the second positioning member 322 is at the fastening position. Therefore, the fastening portions 3212, 3223 are favorable for maintaining the second positioning member 322 at the fastening position so as to prevent the second positioning member 322 at the fastening position from unexpectedly moving away from the first positioning member 321, thereby improving the capability of the positioning members 321, 322 for positioning the wire 99.

According to the disclosure, a part of the wire 99 is disposed in the wire management groove 312, and a part of the wire 99 is positioned between the first positioning member 321 and the second positioning member 322. Thus, the position of the wire 99 at the wire management module 30 is fixed by the wire management groove 312 and the positioning assembly 320, thereby preventing the wires 99 from becoming tangled and resulting in devices accidentally becoming unplugged.

Figure 6:
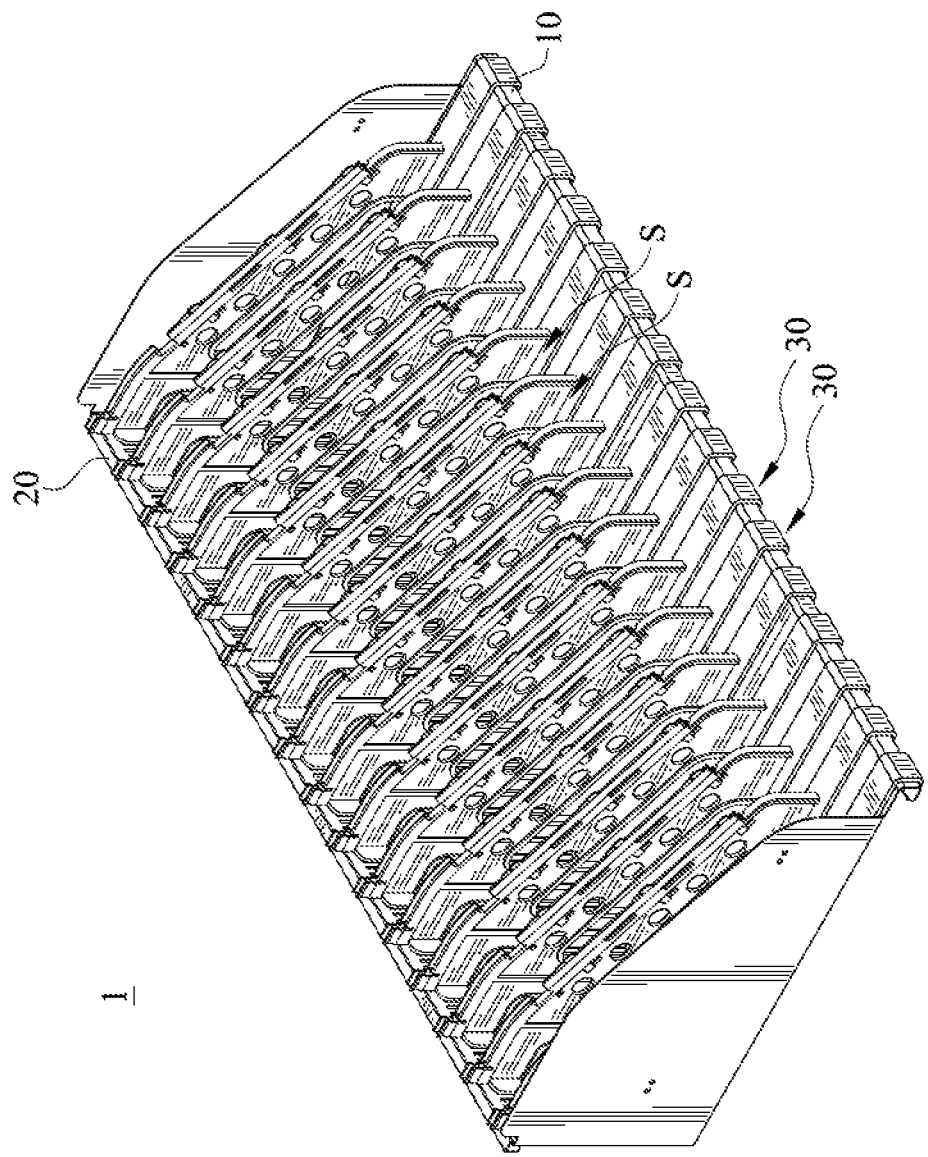
FIG. 6 is a perspective view of the storage device with different quantity of the wire management module according to the first embodiment.
Figure 7:
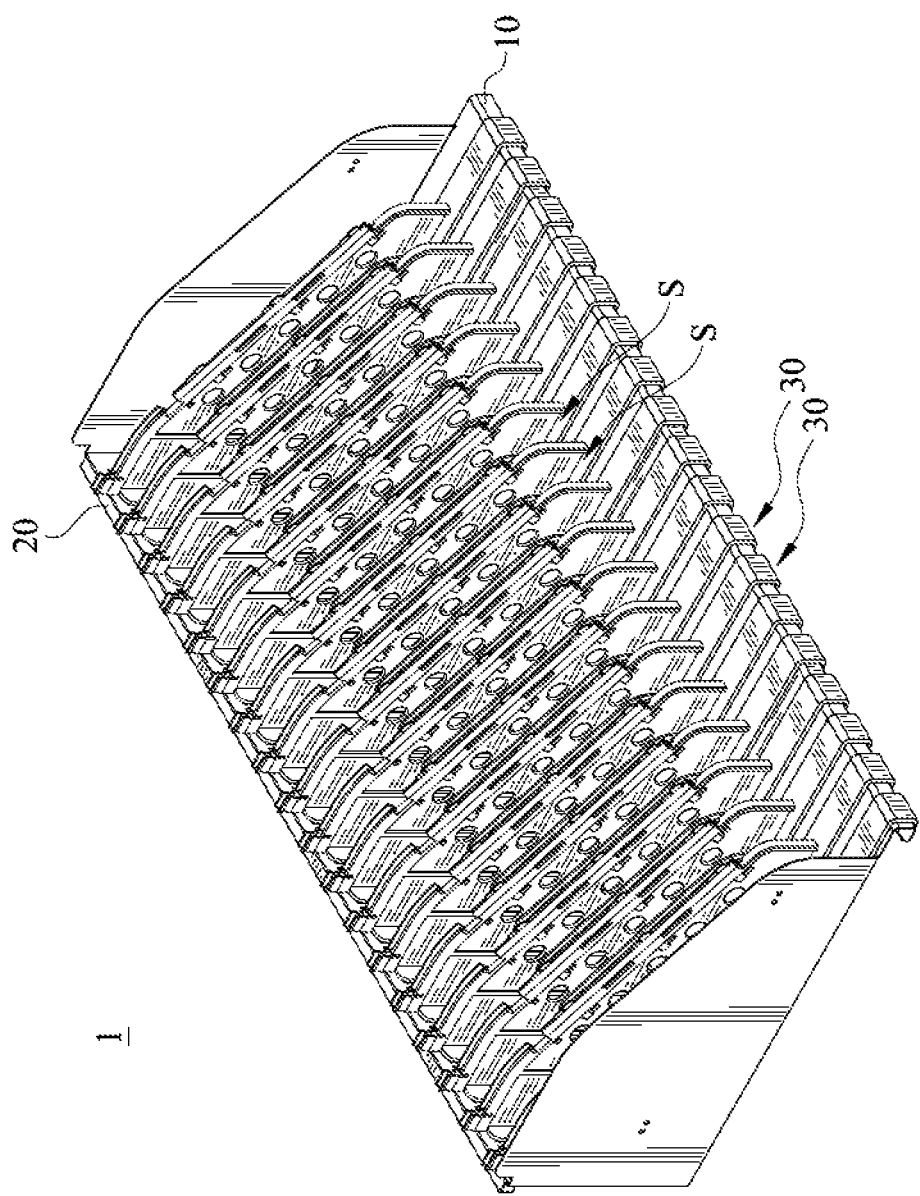
FIG. 7 is a perspective view of the storage device with another different quantity of the wire management module according to the first embodiment.

In this embodiment, the wire management modules 30 are detachably assembled together with the base 10 and the board 20 so that the distance between every two of the wire management modules 30 that are adjacent to each other is adjustable, and the quantity of the wire management module 30 is also adjustable. Please refer to FIG. 1, FIG. 6 and FIG. 7. FIG. 6 is a perspective view of the storage device with different quantity of the wire management module according to the first embodiment. FIG. 7 is a perspective view of the storage device with another different quantity of the wire management module according to the first embodiment. In FIG. 1, the storage device 1 includes a total of thirteen wire management modules 30 so as to form a total of thirteen accommodation spaces S. When it is necessary to adjust the distance between two adjacent wire management modules 30 or the quantity of the wire management modules 30, some of the management modules 30 or all of the wire management modules 30 are detached from the base 10 and the board 20, and the necessary quantity or distance is decided by the user. Then, the user disposes the wire management modules 30 to the base 10 and the board 20 according to the necessary quantity or distance decided. For example, in FIG. 6, the storage device 1 includes a total of fifteen wire management modules 30 so as to form a total of fifteen accommodation spaces S, and each of the accommodation spaces S is narrower for accommodating thinner electronic devices. In FIG. 7, the storage device 1 includes a total of eighteen wire management modules 30 so as to form a total of eighteen accommodation spaces S. In this embodiment, the wire management module 30 is detachable from the base 10 and the board 20, but the disclosure is not limited thereto. In other embodiments, the wire management module can be secured to the base and the board (undetachable from the base and the board). In some embodiments, the storage device can include the base without including the board, and the wire management module is detachably or undetachably disposed on the base.

Figure 8:
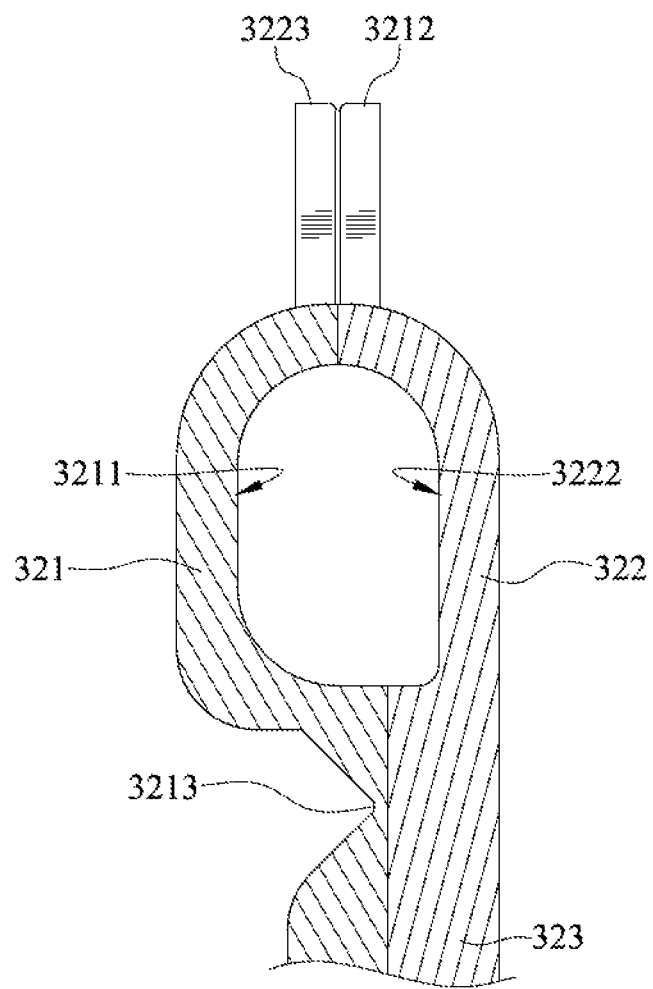
FIG. 8 is a partially cross sectional view of a wire management module of a storage device according to a second embodiment.
Figure 9:
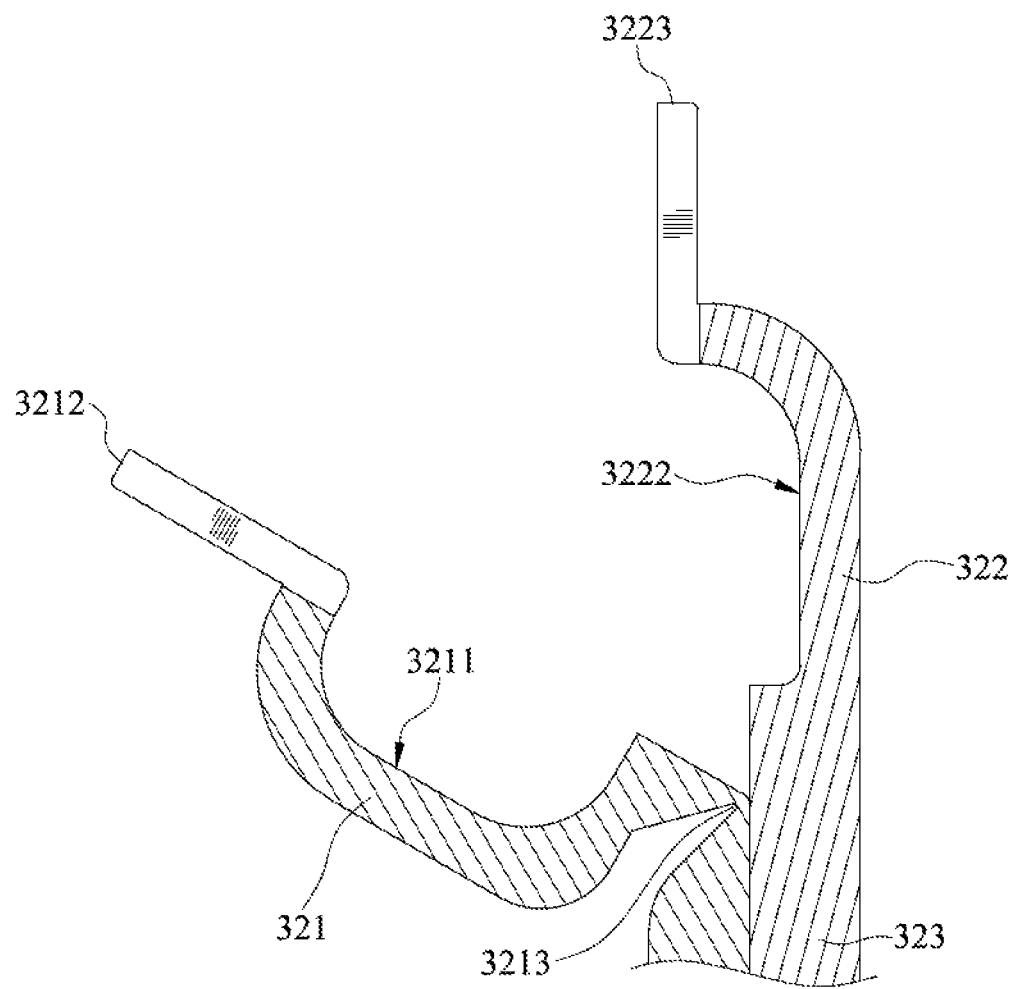
FIG. 9 is a partially cross sectional view of the wire management module in FIG. 8 with a positioning member at a releasing state.

In the first embodiment, the first positioning member 321 is fixed to the partition 310 while the second positioning member 322 is rotatable relative to the assembling member 323, but the disclosure is not limited thereto. Please refer to FIG. 8 and FIG. 9. FIG. 8 is a partial cross-sectional view of a wire management module of a storage device according to a second embodiment. FIG. 9 is a partially cross sectional view of the wire management module in FIG. 8 with a positioning member at a releasing state. Since the second embodiment is similar to the first embodiment, only the differences will be illustrated hereafter.

In this embodiment, the second positioning member 322 of the wire management module 30 is secured to the assembling member 323. The first positioning member 321 may have an edge 3213 connected to the partition 310, and the first positioning member is rotatable relative to the partition 310 with the edge 3213 as a rotation axis. The first positioning member 321 has a fastening position and a releasing position. To sum up, the first positioning member 321 in the second embodiment is rotatable relative to the partition 310 while the second positioning member 322 is unrotatable. The first positioning member 321 and the partition 310 may be integrally formed as a single plastic member, and the edge 3213 may be formed by a molding process for the plastic member, but the disclosure is not limited thereto. In other embodiments, the first positioning member and the partition may be two independent members, and the first positioning member is pivoted to the partition.

In the first and second embodiments, the first positioning member 321 is rotatable, or alternatively the second positioning member 322 is rotatable, but the disclosure is not limited thereto. In other embodiments, both the first positioning member and the second positioning member are rotatable relative to the partition.

Figure 10:
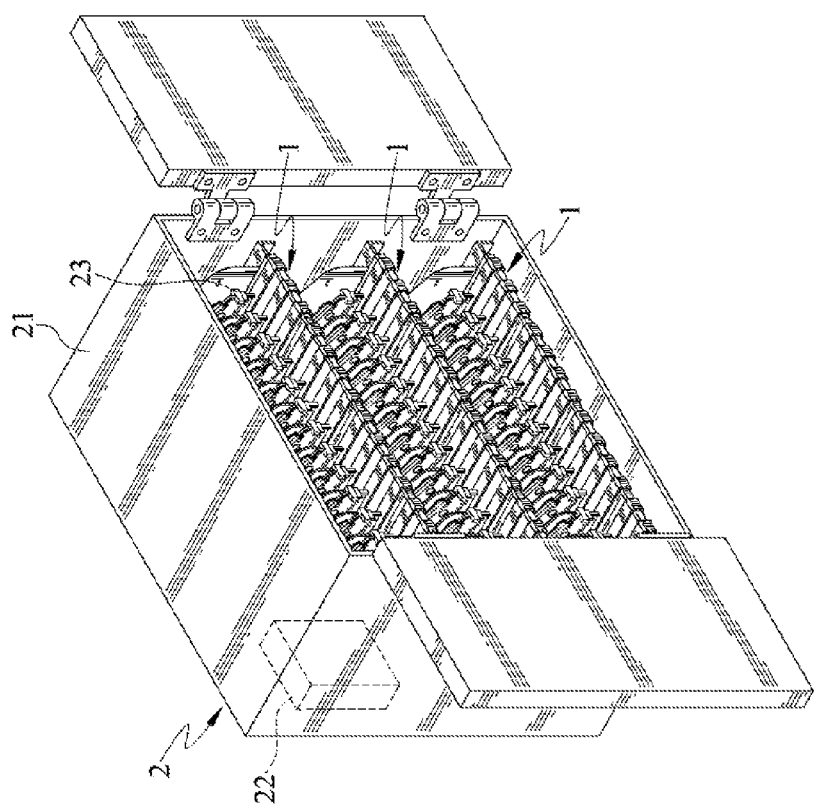
FIG. 10 is a perspective view of a charge cabinet according to a third embodiment.

The storage device may be applicable to a charge cabinet. Please refer to FIG. 10. FIG. 10 is a perspective view of a charge cabinet according to a fourth embodiment. In this embodiment, the charge cabinet 2 may include at least one storage device 1 according to one of the embodiment of the disclosure, a case 21, a power supply 22 and a plurality of wires 99. The case 21 may be a frame of the charge cabinet 2. The power supply 22 may be disposed on an outer surface of the case 21 or disposed in the case 21. Two ends of the wires 99 may be respectively electrically connected to the power supply 22 and a port of an electronic device (not shown in the drawing). The storage device 1 may be disposed in the case 21. The wire 99, for example, is a cable for charging the electronic device disposed in the accommodation space of the storage device 1. The base and the board of the storage device 1 can be integrally with the case 21 as a single member.

According to the disclosure, the wire management groove formed on the partition so that it is favorable for positioning the wire at a side of the partition. After the wire is accommodated in the wire management groove, the first positioning member and the second positioning member are adapted for positioning the wire on the supporting surface of the partition. Therefore, it is favorable for preventing the wire from becoming tangled and resulting in device accidentally becoming unplugged.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:
1. A storage device, comprising:
a base; and
a plurality of wire management modules, each of the plurality of wire management modules comprising:
a partition disposed to the base and having a supporting surface and a wire management groove at a side of the partition away from the base, the wire management groove located at the supporting surface, and the wire management groove being for accommodating a wire; and
a positioning assembly comprising a first positioning member, a second positioning member and an assembling member, the first positioning member disposed to the partition and protruding out of the supporting surface, an edge of the second positioning member being integrally connected to the assembling member, the assembling member assembled together with the partition, the second positioning member being rotatable around the edge of the second positioning member as a rotation axis in relation to the assembling member to be at either a fastening position or a releasing position;
wherein when the second positioning member is at the fastening position, the first positioning member and the second positioning member face each other and jointly cover a part of the supporting surface for positioning a part of the wire between the first positioning member and the second positioning member; when the second positioning member is at the releasing position, the second positioning member and the first positioning member are separated from each other for releasing the wire; the partitions of the plurality of wire management modules and the base jointly form a plurality of accommodation spaces.

2. The storage device according to claim 1, wherein the first positioning member comprises a first fastening portion, the second positioning member comprises a second fastening portion, the first fastening portion is located at a side of the first positioning member away from the supporting surface, and the second fastening portion is located at a side of the second positioning member away from the assembling member; and the first fastening portion and the second fastening portion are fastened to each other when the second positioning member is at the fastening position.

3. The storage device according to claim 1, wherein the first positioning member has a first concave surface, the second positioning member has a second concave surface, and the first concave surface faces the second concave surface when the second positioning member is at the fastening position.

4. The storage device according to claim 1, wherein the first positioning member is fixed to the supporting surface of the partition, the partition further has a plurality of recesses located at a side surface of the partition, the assembling member comprises a plurality of protrusions, and the plurality of protrusions is respectively fastened to the plurality of recesses.

5. The storage device according to claim 1, wherein the wire management groove has two limiting surfaces and a bottom surface, each of the two limiting surfaces has a first edge and a second edge that are opposite to each other, the second edges of the two limiting surfaces are respectively connected to two sides of the bottom surface that are opposite to each other, and a distance between the second edges of the two limiting surfaces is less than a distance between the first edges of the two limiting surfaces.

6. The storage device according to claim 5, wherein at least one of the two limiting surfaces comprises a first limiting section, a supporting section and a second limiting section, the supporting section is located between the first limiting section and the second limiting section, a distance between a side of the supporting section close to the first limiting section and the other one of the two limiting surfaces is greater than a distance between a side of the supporting section close to the second limiting section and the other one of the two limiting surfaces.

7. The storage device according to claim 1, wherein the partition comprises a partitioning part and an assembling part connected to each other, the supporting surface and the wire management groove are located at the partitioning part, the positioning assembly is disposed to the partitioning part, and the assembling part and the base are detachably assembled together.

8. The storage device according to claim 1, further comprising a board standing on the base, comprising a plurality of holes, each of the partitions comprises a partitioning part and a block connected to the partitioning part, the supporting surface and the wire management groove are located at the partitioning part, and the block is detachably fastened into the hole.

9. A storage device, comprising:
a base; and
a plurality of wire management modules, each of the plurality of wire management modules comprising:
a partition disposed to the base and having a supporting surface and a wire management groove at a side of the partition away from the base, the wire management groove located at the supporting surface, and the wire management groove being for accommodating a wire; and
a positioning assembly comprising a first positioning member, a second positioning member and an assembling member, an edge of the first positioning member being integrally connected to the partition, the second positioning member connected to the assembling member and protruding out of the supporting surface, the assembling member assembled together with the partition, the first positioning member being rotatable around the partition with the edge of the first positioning member as a rotation axis in relation to the assembling member to be at either a fastening position or a releasing position;
wherein when the first positioning member is at the fastening position, the first positioning member and the second positioning member face each other and jointly cover a part of the supporting surface for positioning a part of wire between the first positioning member and the second positioning member; when the first positioning member is at the releasing position, the first positioning member and the second positioning member are separated from each other for releasing wire; the partitions of the plurality of wire management modules and the base jointly form a plurality of accommodation spaces.

10. A charge cabinet, comprising:
a case;
a power supply disposed to the case;
the storage device according to claim 1 disposed in the case; and
the wires electrically connected to the power supply.

11. The charge cabinet according to claim 10, wherein the first positioning member comprises a first fastening portion, the second positioning member comprises a second fastening portion, the first fastening portion is located at a side of the first positioning member away from the supporting surface, and the second fastening portion is located at a side of the second positioning member away from the assembling member; and the first fastening portion and the second fastening portion are fastened to each other when the second positioning member is at the fastening position.

12. The charge cabinet according to claim 10, wherein the first positioning member comprises a first fastening portion, the second positioning member comprises a second fastening portion, the first fastening portion is located at a side of the first positioning member away from the supporting surface, and the second fastening portion is located at a side of the second positioning member away from the assembling member; and the first fastening portion and the second fastening portion are fastened to each other when the second positioning member is at the fastening position.

13. The charge cabinet according to claim 10, wherein the first positioning member has a first concave surface, the second positioning member has a second concave surface, and the first concave surface faces the second concave surface when the second positioning member is at the fastening position.

14. The charge cabinet according to claim 10, wherein the first positioning member is fixed to the supporting surface of the partition, the partition further has a plurality of recesses located at a side surface of the partition, the assembling member comprises a plurality of protrusions, and the plurality of protrusions is respectively fastened to the plurality of recesses.

15. The charge cabinet according to claim 10, wherein the wire management groove has two limiting surfaces and a bottom surface, each of the two limiting surfaces has a first edge and a second edge that are opposite to each other, the second edges of the two limiting surfaces are respectively connected to two sides of the bottom surface that are opposite to each other, and a distance between the second edges of the two limiting surfaces is less than a distance between the first edges of the two limiting surfaces.

16. The charge cabinet according to claim 15, wherein at least one of the two limiting surfaces comprises a first limiting section, a supporting section and a second limiting section, the supporting section is located between the first limiting section and the second limiting section, and a distance between a side of the supporting section, close to the first limiting section, and the other one of the two limiting surfaces is greater than a distance between a side of the supporting section, close to the second limiting section, and the other one of the two limiting surfaces.

17. The charge cabinet according to claim 10, wherein the partition comprises a partitioning part and an assembling part connected to each other, the supporting surface and the wire management groove are located at the partitioning part, the positioning assembly is disposed to the partitioning part, and the assembling part and the base are detachably assembled together.

18. The charge cabinet according to claim 10, further comprising a board standing on the base, comprising a plurality of holes, each of the partitions comprises a partitioning part and a block connected to the partitioning part, the supporting surface and the wire management groove are located at the partitioning part, and the block is detachably fastened into the hole.

* * * * *